US006387710B1

(12) United States Patent
Loewy et al.

(10) Patent No.: US 6,387,710 B1
(45) Date of Patent: May 14, 2002

(54) AUTOMATED SAMPLE PROCESSOR

(75) Inventors: Zvi Gerald Loewy, Fair Lawn, NJ (US); Christopher Carter Gregory, Newtown, PA (US); Zygmunt Marian Andrevski, Princeton, NJ (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 09/433,155

(22) Filed: Nov. 3, 1999

Related U.S. Application Data

(60) Provisional application No. 60/112,621, filed on Dec. 17, 1998, and provisional application No. 60/107,021, filed on Nov. 4, 1998.

(51) Int. Cl.[7] .................................................. G01N 1/10

(52) U.S. Cl. ......................... 436/180; 422/99; 422/100; 422/101; 422/103; 436/63; 436/177; 436/178; 436/526; 210/222; 210/223; 210/695; 73/863.71; 73/863.72; 73/863.73

(58) Field of Search .......................... 422/99, 100, 101, 422/103; 435/7.2; 436/63, 177, 178, 180, 526; 73/863.33, 863.71, 863.72, 863.73; 210/222, 223, 695

(56) References Cited

U.S. PATENT DOCUMENTS

| | | | | | |
|---|---|---|---|---|---|
| 4,585,623 | A | | 4/1986 | Chandler | |
| 4,598,576 | A | * | 7/1986 | Goldsmith et al. | 73/19 |
| 4,736,636 | A | * | 4/1988 | Fini et al. | 73/863.73 |
| 4,889,692 | A | | 12/1989 | Holtzman | |
| 5,384,095 | A | | 1/1995 | Golz et al. | |
| 5,523,231 | A | * | 6/1996 | Reeve | 435/270 |
| 5,674,394 | A | | 10/1997 | Whitmore | |
| 5,863,801 | A | | 1/1999 | Southgate et al. | |
| 5,976,369 | A | | 11/1999 | Howe et al. | |

OTHER PUBLICATIONS

Merel et al., Completely Automated Extraction of DNA from Whole Blood, Clinical Chemistry, 42 (8): 1285–1286, 1996.

* cited by examiner

*Primary Examiner*—Jill Warden
*Assistant Examiner*—Kathryn Bex
(74) *Attorney, Agent, or Firm*—William J. Burke

(57) ABSTRACT

Provided is a liquid handling device comprising: a cylindrical actuator cavity in a substrate, the actuator cavity intersected by two or more actuator channels; one or more chambers with an access channel adapted to connect to a separate one of actuator channels; and a actuator comprising (a) a cylindrical body having a cylinder axis and having therein a liquid-handling compartment with, arrayed along the cylinder axis, a first end and a second end, the liquid-handling compartment being closed at the second end, (b) a dispensing channel located at the second end and traversing the cylindrical body, the dispensing channel adapted to be separately aligned with the actuator channels, wherein the actuator is adapted to receive in a seal-tight manner a plunger that operates to confine an effective chamber defined by the plunger and the second end by moving toward the second end or to expand the effective chamber by moving toward the first end. Preferably, one or more of the chambers are formed within the substrate.

12 Claims, 5 Drawing Sheets

AUTOMATED SAMPLE PROCESSOR

This application claims the priority of Loewy et al., "Automated System for sample Processing and Cellular Concentration," Ser. No. 60/112,621, filed Dec. 17, 1998 (SAR 12824) and Gregory, "Syringe Pump Sample Prep System," Ser. No. 60/107,021, filed Nov. 4, 1998 (SAR 12556).

This invention was at least partially supported by the Government Contract No. 70NANB5H1037. The government may have certain rights in this invention.

The present invention relates to a device for manipulating fluids and conducting reactions, and methods using such device.

The invention described provides disposable tools for conducting a number of processes important to biotechnology-based assays, such as cell capture and concentration, cell lysis and nucleic acid capture, nucleic acid amplification reactions, and the like. The liquid handling devices of the invention can be used to isolate sample material (or control material) in an enclosed, disposable device, helping minimize cross-contamination of other assays or processes.

SUMMARY OF THE INVENTION

The invention provides a liquid handling device comprising: a cylindrical actuator cavity in a substrate, the actuator cavity intersected by two or more actuator channels; one or more chambers with an access channel adapted to connect to a separate one of actuator channels; and a actuator comprising (a) a cylindrical body having a cylinder axis and having therein a liquid-handling compartment with, arrayed along the cylinder axis, a first end and a second end, the liquid-handling compartment being closed at the second end, (b) a dispensing channel located at the second end and traversing the cylindrical body, the dispensing channel adapted to be separately aligned with the actuator channels, wherein the actuator is adapted to receive in a seal-tight manner a plunger that operates to confine an effective chamber defined by the plunger and the second end by moving toward the second end or to expand the effective chamber by moving toward the first end. Preferably, one or more of the chambers are formed within the substrate. Preferably, two or more of the chambers are within the substrate, each such chamber having an access channel adapted to connect to a separate one of actuator channels. Preferably, one or more of the chambers are enclosed at one end by a gas-selective permeable membrane so that such chambers can be filled with liquid through its access channel until gas has been removed through the gas -selective permeable membrane, and liquid can be drawn out of the chamber with the pressure equalized by gas transport through the gas-selective permeable membrane.

The invention also provides a liquid handling array comprising: two or more liquid handling; and one or more first motors for moving the actuator from one alignment of the dispersing with an actuator channel to another or with a closed segment of the actuator cavity. Preferably, there are one or more second motors for moving the plunger to expand or contract the effective chamber.

The invention further provides a method of manipulating liquids comprising: operating the actuator of the liquid handling device to align the dispensing channel with a said actuator channel; operating the plunger to move fluid from a thereby connected chamber into the actuator compartment; operating the actuator to align the dispensing channel with a second said actuator channel; and operating the plunger to move fluid from the actuator compartment to a thereby connected second said chamber.

A method of manipulating liquids comprising: providing magnetically susceptible beads having attached thereto a member of a binding pair in a chamber of the liquid handling device of the invention; introducing a liquid containing a second member of the binding pair to bind the second member to the beads; activating a magnet (e.g., by engaging an electromagnet or drawing a magnet to a location where the field is effective) to draw the beads from the access channel of the chamber; operating the actuator of the liquid handling device to align a dispensing channel with an actuator channel connected to the said access channel; and drawing the liquid out of the chamber through the access channel. The beads can be used to bind and isolate macromolecules or cells (e.g., by cell-surface.

BRIEF DESCRIPTION OF THE DRAWINGS

FIG. 1A shows a top view, while FIG. 1B shows a cut-away view.

FIG. 2A shows a side, cut-away view. FIG. 2B is bottom view. FIG. 2C is an exploded view of an indicated portion of FIG. 2A. FIG. 2D illustrates a plunger engaged in the actuator.

DETAILED DESCRIPTION OF THE INVENTION

Figure 1A:
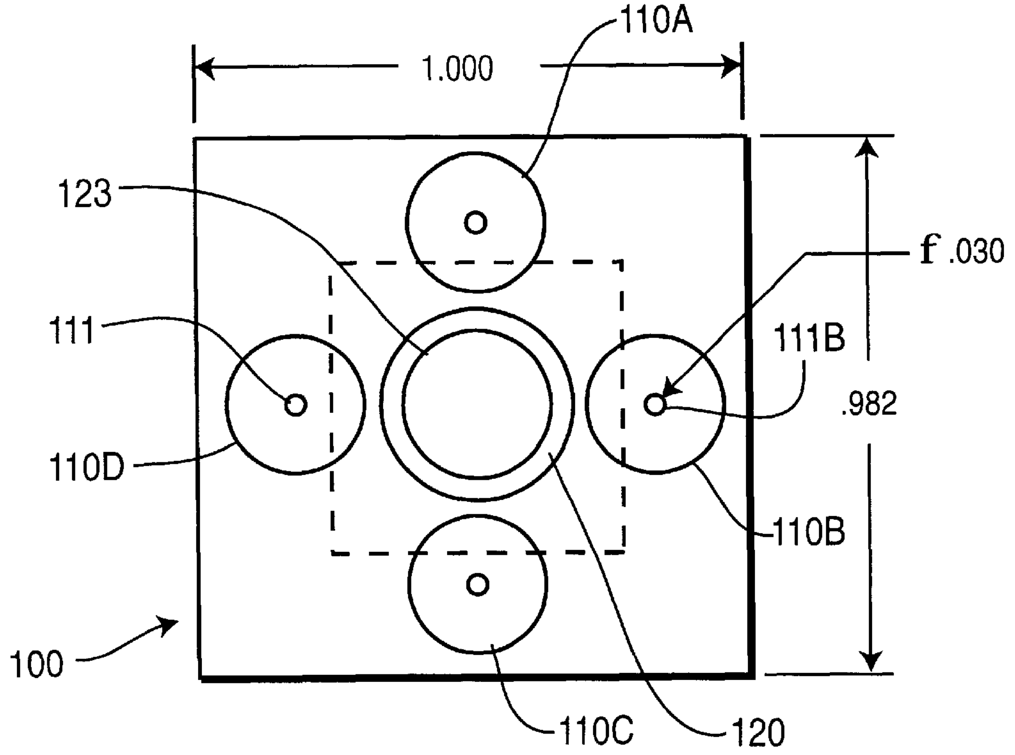
FIGS. 1A and 1B display a base piece for a cassette that provides the liquid handling device.
Figure 1B:
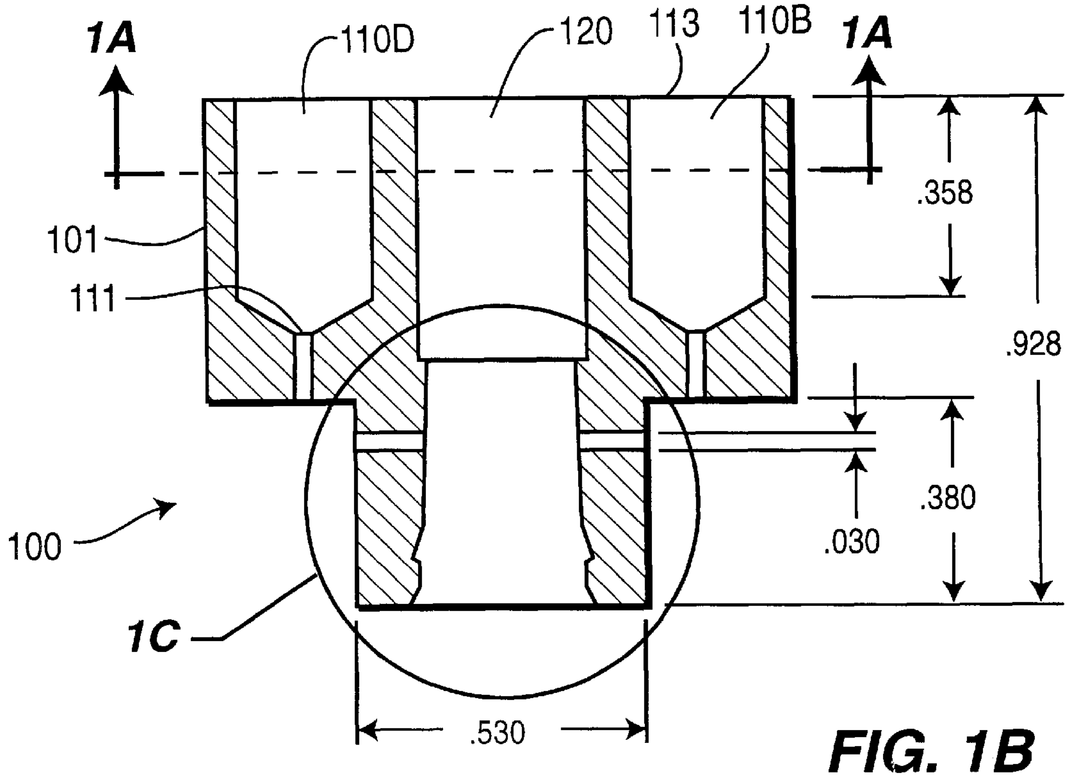
Figure 1C:
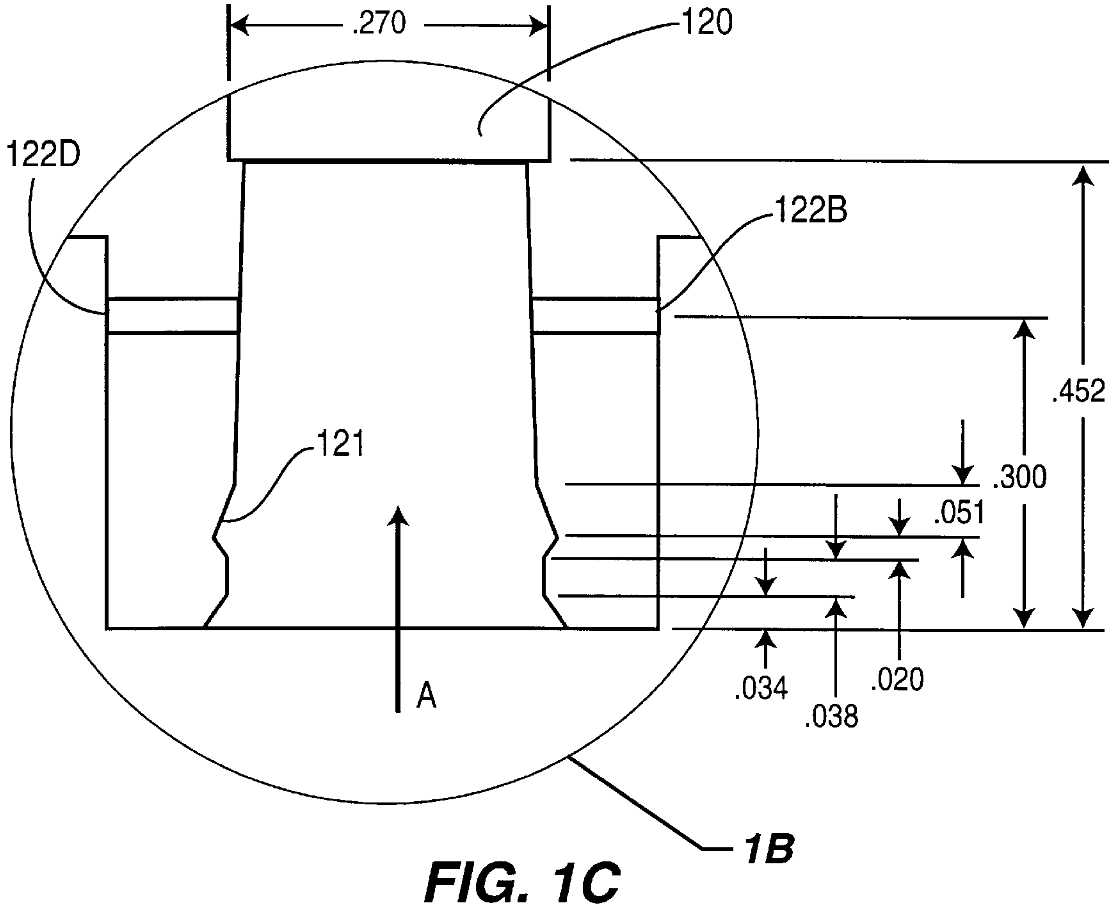
FIG. 1C shows an expanded view of the portion of FIG. 1B indicated with the circle.
Figure 2A:
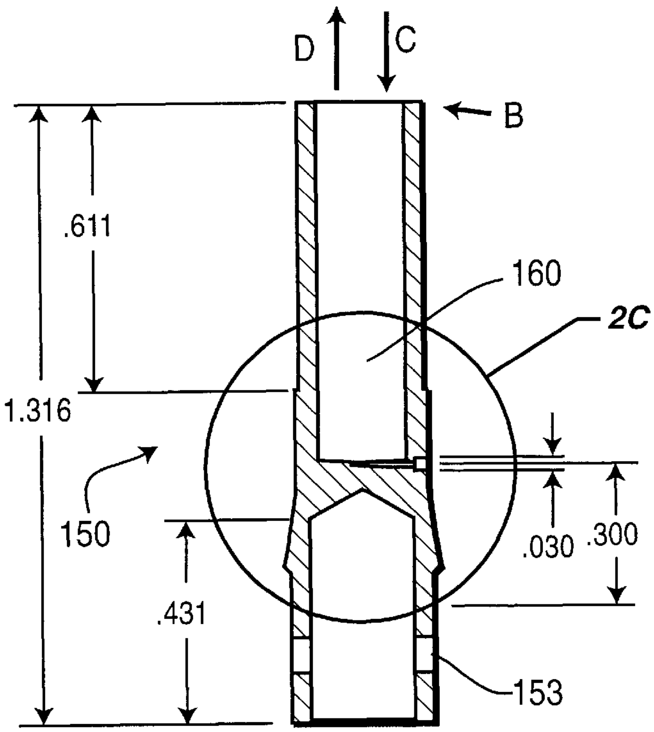
FIGS. 2A through 2D illustrate the actuator.
Figure 2B:
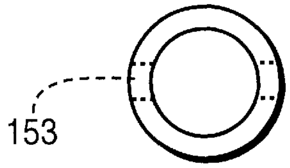
Figure 2D:
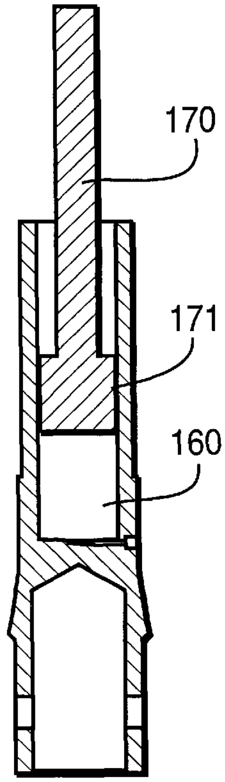

The invention is illustrated by the embodiment of the drawings. FIG. 1A shows a top view of a liquid handling cassette 100 with four fluid chambers 110A through 110D formed in substrate 101. The fluid chambers 110 have access channels 111. Actuator cavity 120 interacts with an actuator 150 as will be described below. Slotted dimple 121, if present, provides one mechanism for controlling the alignment of an actuator 150 with a corresponding ridge 152. Actuator channels 122 allow fluid to flow in an out of actuator compartment 160 (FIG. 2A). In the illustration, second actuator channel 122B is adapted to connect, via an intermediate channel provided in an array device into which the cassette can be fitted, to a second access channel 111B and second fluid chamber 110B. Actuator 150 can be inserted into the cassette along direction/axis A (the "cylinder axis"). Substrate 101 can be formed of any material that can be appropriately formed by molding, cutting, etching, or the like. One preferred material is polycarbonate, such as a lexan polycarbonate from GE Plastics, Pittsfield, Mass.

The fluid chambers are illustrated as of equal size, but it should be recognized that differential sizes can be desirable for use in certain liquid handling operations. For example, one fluid chamber ("reaction chamber") can be the site of the majority of manipulative steps, with the remainder serving as reservoirs for reagents or waste. In such an example, it can be desirable for the reaction chamber to be smaller than the reagent or waste reservoirs.

Figure 5:
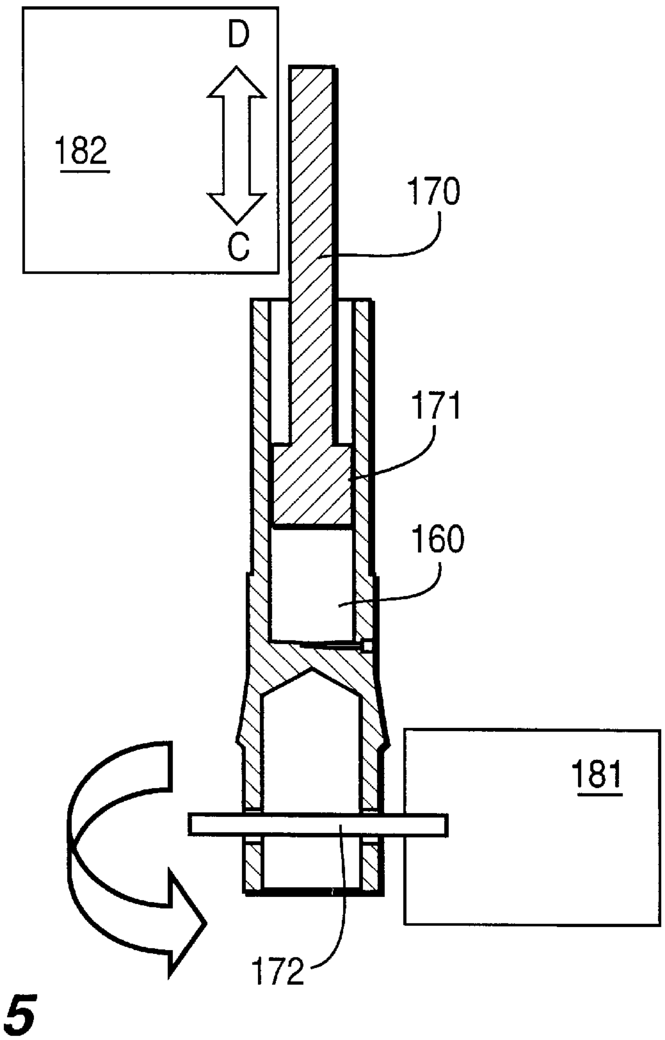
FIG. 5 shows motors engaged with the actuator.

Actuator 150, illustrated in FIG. 2 and FIG. 5 has a dispensing channel 151 that can be aligned with an actuator channel 122 or with a portion of surface 123 lacking any channel. End B of the actuator is inserted into the cassette along direction A until ridge 152 engages slotted dimple 121. Slots 153 allow the actuator 150 to be engaged by a bar 172 engaged by a motor 181 that can be used to move the actuator rotationally or, in some embodiments, along axis A, to make alignments. Opening 154 accepts the plunger 170 that is moved in direction C by for example motor 182 to compress fluid in compartment 160 or in direction D to draw fluid into the compartment 160. The actuator can be formed of any material that can be appropriately formed by molding, cutting, etching, or the like. Preferably, consideration is given in selecting materials for materials that, in conjunction with those of the substrate (e.g., substrate 101), can form directly or through suitable coatings, effective fluid seals. In one embodiment, the actuator is formed of polypropylene.

Figure 2C:
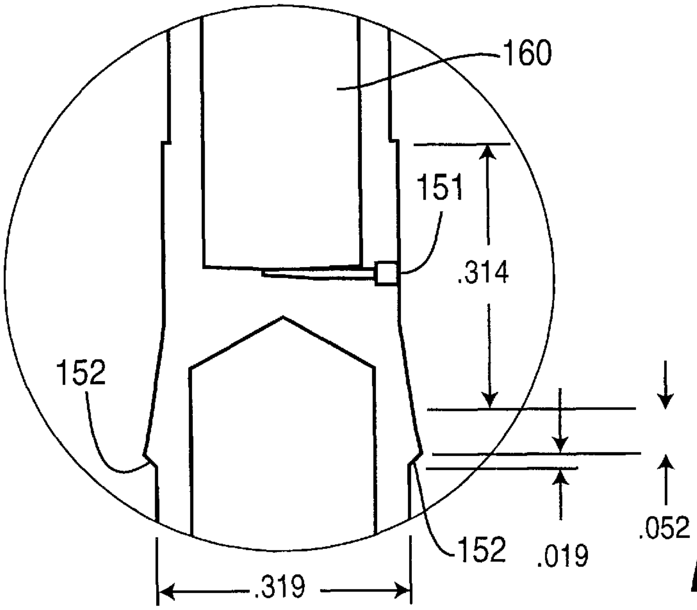

Plunger 170 is illustrated in FIG. 2C. Plunger 170, or plunger head 171 is formed of any material that can be appropriately formed by molding, cutting, etching or the like, with the material or a coating thereto preferably selected with consideration of the material's suitability for forming a seal with the sides compartment 160. Suitable materials for the plunger head include, for example, polypropylene or polystyrene.

Figure 3B:
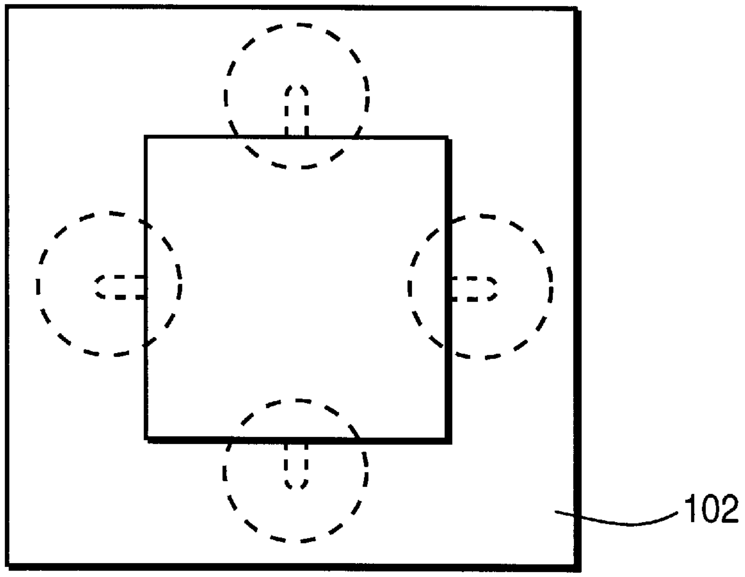
FIGS. 3A and 3B illustrate in a bottom and cut-away side view, respectively, an embodiment with a two-part base piece.
Figure 3A:
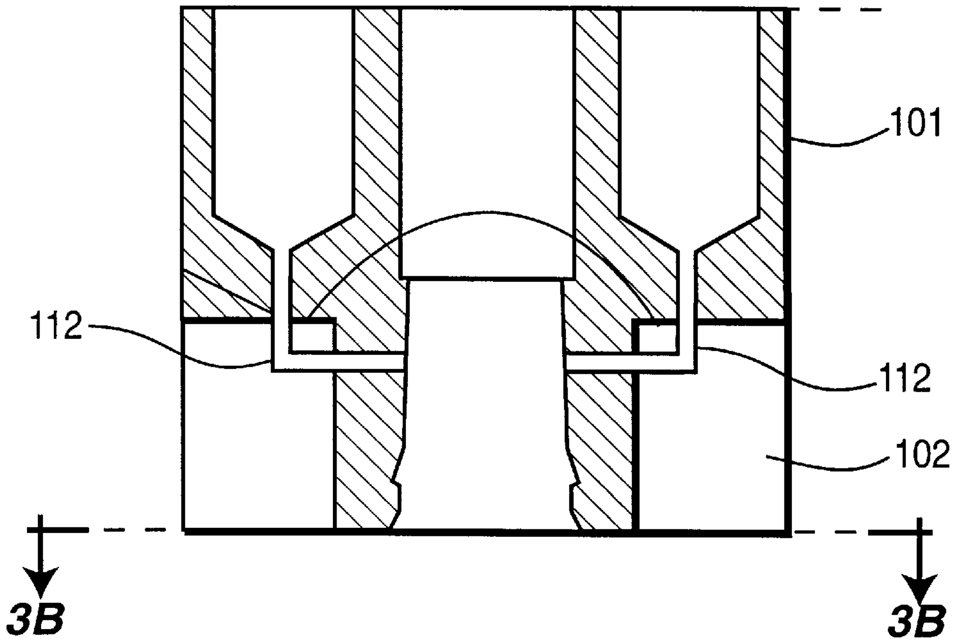

FIG. 3 illustrates a second substrate 102 that fits with first substrate 101 to provide connecting channels 112.

Chamber ends 113 can be enclosed, preferably with a membrane that selectively transports gases over liquids. Such membrane can be deployed in a support matrix. Suitable membranes include, for example, modified acrylic copolymer membranes cast on nonwoven nylon, such as a Versapor R membrane from Gelman Sciences Inc., Ann Arbor, Mich. Such gas-selective permeable membranes allow the chambers 113 to be filled with liquid up to the point at which air pockets have been removed by transport across the membrane, or liquid to be drawn out by partial vacuum, for example created by moving the plunger 170 in direction D, with air transport across the membrane allowing pressure equalization.

The elements of the cassette, including those that interact with external mechanical elements such as motors, are preferably disposable. Thus, for example, all materials contaminated with nucleic acid that could interfere with a subsequent procedure can be discarded.

In its simpler implementations, sample material is introduced into the cassette manually. For example, any material enclosing the chamber end of a chamber 110 that is a reaction chamber is removed, the sample introduced, and the material replaced to enclose the chamber 110. Fluidic connections can be added so that sample is pumped into the chamber through a second access channel. For example, the chamber can contain beads, such as beads available from Dynal (Oslo, Norway), to which are bound antibodies specific for a given cell type are attached. A suspension of the cells can be pumped over the beads, with excess liquid drained via a two-way flow through the actuator compartment (as described below) or through an alternative second substrate that can be reversibly connected and in which the connecting channels are directed to waste. The cell-specific beads act to concentrate the cells.

The above-illustrated actuator operates with single connections to chambers, with fluid drawn into the actuator compartment or pumped out at a given connection. Other modifications will be apparent. For example, the actuator can have two dispensing channels with an appropriate angular offset. The angular offset can be selected so that a first dispensing channel always aligns with an actuator channel with the second dispensing channel blocked, while the second dispensing channel can be aligned an actuator channel with the first dispensing channel aligned with a channel to waste. For example, where the actuator channels are offset by 90°, waste channels can be offset in one direction at 30°. First and second dispensing channels can be offset by 30°, so that one alignment is just with the actuator channel, while another alignment is to both the actuator channel and the waste channel.

Figure 4:
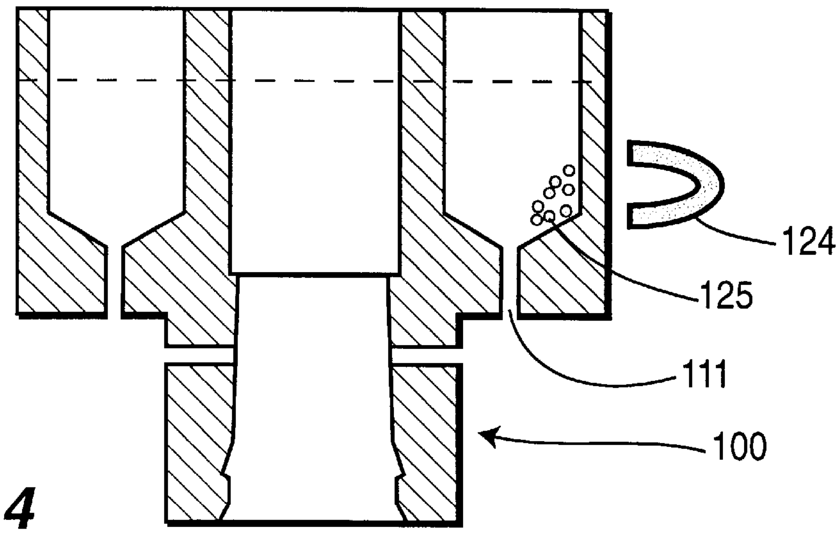
FIG. 4 shows beads confined in a cassette.

The cassette can be used with solid capture supports placed in one or more of the chambers, such as magnetic beads that bind biomolecules. Magnetic beads can be magnetically confined away from the access channels when liquid is being drained, thereby helping assure that the beads do not interfere with the draining process. As illustrated in FIG. 4, magnet 124 isolates magnetic beads 125 from access channels 111.

Illustrative dimensions in inches are shown in the drawings.

All publications and references, including but not limited to patents and patent applications, cited in this specification are herein incorporated by reference in their entirety as if each individual publication or reference were specifically and individually indicated to be incorporated by reference herein as being fully set forth. Any patent application to which this application claims priority is also incorporated by reference herein in its entirety in the manner described above for publications and references.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A liquid handling device comprising:

a cylindrical actuator cavity in a substrate, the actuator cavity intersected by two or more actuator channels;

one or more chambers each with an access channel adapted to connect to a separate one of the actuator channels, wherein one or more of the chambers are formed within the substrate; and an actuator comprising a cylindrical body having a cylinder axis and having therein a liquid-handling compartment with, arrayed along the cylinder axis, a first end and a second end, the liquid-handling compartment being closed at the second end, a dispensing channel located at the second end and traversing the cylindrical body, the dispensing channel adapted to be separately rotatably aligned with the actuator channels, wherein the liquid-handling compartment is adapted to receive in a seal-tight manner a plunger that operates to confine an effective chamber defined by the plunger and the second end by moving toward the second end or to expand the effective chamber by moving toward the first end.

2. The liquid handling device of claim 1, comprising two or more chambers within the substrate, each such chamber having an access channel adapted to connect to a separate one of actuator channels.

3. The liquid handling device of claim 1, wherein one or more of the chambers are enclosed at one end by a membrane that selectively transports gases over liquids so that such chambers can be filled with liquid through its access channel until gas has been removed through the gas-selective permeable membrane, and liquid can be drawn out of the chamber with the pressure equalized by gas transport through the membrane.

4. A liquid handling array comprising:

two or more liquid handling devices of claim 1; and one or more first motors for moving the actuator from one alignment of the dispersing channel with an actuator channel to another or to alignment with a closed segment of the actuator cavity.

5. A method of manipulating liquids comprising the steps of:

providing a liquid handling device comprising:

a cylindrical actuator cavity in a substrate, the actuator cavity intersected by two or more actuator channels;

one or more chambers each with an access channel adapted to connect to a separate one of the actuator channels;

an actuator comprising a cylindrical body having a cylinder axis and having therein a liquid-handling compartment with, arrayed along the cylinder axis, a first end and a second end, the liquid-handling compartment being closed at the second end, a dispensing channel located at the second end and traversing the cylindrical body, the dispensing channel adapted to be separately rotatably aligned with the actuator channels, wherein the liquid-handling compartment is adapted to receive in a seal-tight manner a plunger that operates to confine an effective chamber defined by the plunger and the second end by moving toward the second end or to expand the effective chamber by moving toward the first end; and the plunger;

operating the actuator of the liquid handling device to align the dispensing channel with one of said actuator channels;

operating the plunger to move fluid from a thereby connected chamber into the actuator compartment;

operating the actuator to align the dispensing channel with a second said actuator channel; and operating the plunger to move fluid from the actuator compartment to a thereby connected second said chamber.

6. A liquid handling device comprising:

a cylindrical actuator cavity in a substrate, the actuator cavity intersected by two or more actuator channels;

one or more chambers each with an access channel adapted to connect to a separate one of the actuator channels, wherein one or more of the chambers are formed within the substrate;

an actuator comprising a cylindrical body having a cylinder axis and having therein a liquid-handling compartment with, arrayed along the cylinder axis, a first end and a second end, the liquid-handling compartment being closed at the second end, a dispensing channel located at the second end and traversing the cylindrical body, the dispensing channel adapted to be separately rotatably aligned with the actuator channels, wherein the liquid-handling compartment is adapted to receive in a seal-tight manner a plunger that operates to confine an effective chamber defined by the plunger and the second end by moving toward the second end or to expand the effective chamber by moving toward the first end; and the plunger.

7. The liquid handling array comprising:

two or more liquid handling devices of claim 6;

one or more first motors for moving the actuator from one alignment of the dispersing channel with a first of said actuator channels to a second of said actuator channels or with a closed segment of the actuator cavity; and one or more second motors for moving the plunger to expand or contract the effective chamber.

8. The liquid handling device of claim 6, comprising two or more chambers within the substrate, each such chamber having an access channel adapted to connect to a separate one of actuator channels.

9. The liquid handling device of claim 6, wherein one or more of the chambers are enclosed at one end by a membrane that selectively transports gases over liquids so that such chambers can be filled with liquid through its access channel until gas has been removed through the gas-selective permeable membrane, and liquid can be drawn out of the chamber with the pressure equalized by gas transport through the membrane.

10. A method of manipulating liquids comprising the steps of:

providing magnetically susceptible beads having attached thereto a first molecule of a binding pair, which binding pair comprises the first molecule and a second member that bind each other, in a first said chamber of the liquid handling device of claim 6;

introducing into the first chamber a liquid containing the second molecule to bind the second molecule to the beads;

activating a magnet to draw the beads from the access channel of the chamber; and operating the actuator of the liquid handling device to align a dispensing channel with an actuator channel connected to the said access channel; and drawing the liquid out of the chamber through the access channel.

11. The method of claim 10, wherein the liquid contains cells and beads bind to the cells, such that the method operates to isolate the cells.

12. The method of claim 10, wherein the liquid contains macromolecules and beads bind to the macromolecules, such that the method operates to isolate the macromolecules.

* * * * *